US007682705B2

(12) United States Patent
Hodgson (10) Patent No.: US 7,682,705 B2
(45) Date of Patent: Mar. 23, 2010

(54) METAL SHEET HAVING A MICROSTRUCTURE RELIEVED OF NOTCHING, CARRIER BODY HAVING A PLURALITY OF SHEETS, AND EXHAUST SYSTEM HAVING THE CARRIER BODY

(75) Inventor: Jan Hodgson, Troisdorf (DE)

(73) Assignee: Emitec Gesellschaft fuer Emissiontechnologie mbH, Lohmar (DE)

( * ) Notice: Subject to any disclaimer, the term of this patent is extended or adjusted under 35 U.S.C. 154(b) by 333 days.

(21) Appl. No.: 11/290,216

(22) Filed: Nov. 30, 2005

(65) Prior Publication Data

US 2006/0107659 A1 May 25, 2006

Related U.S. Application Data

(63) Continuation of application No. PCT/EP2004/005766, filed on May 28, 2004.

(30) Foreign Application Priority Data

May 30, 2003 (DE) ............................. 103 24 889

(51) Int. Cl.
*B32B 3/12* (2006.01)
*B01J 35/04* (2006.01)
*F01N 3/28* (2006.01)

(52) U.S. Cl. ................. 428/593; 428/596; 428/597; 502/439; 502/527.22; 422/180

(58) Field of Classification Search ................. None
See application file for complete search history.

(56) References Cited

U.S. PATENT DOCUMENTS 2,018,085 A * 10/1935 Otho ..................... 29/897.15

| 3,736,787 | A | 6/1973 | Fencl et al. |
| 5,045,403 | A | 9/1991 | Maus et al. |
| 6,481,259 | B1 * | 11/2002 | Durney ..................... 72/324 |
| 6,793,896 | B1 | 9/2004 | Swars |
| 2003/0037586 | A1 * | 2/2003 | Durney et al. .............. 72/379.2 |
| 2003/0072694 | A1 | 4/2003 | Hodgson et al. |
| 2004/0013580 | A1 | 1/2004 | Bruck et al. |
| 2005/0274012 | A1 | 12/2005 | Hodgson et al. |
| 2006/0143919 | A1 * | 7/2006 | Bruck et al. ............... 29/896.6 |

FOREIGN PATENT DOCUMENTS

| DE | 1 008 692 | 5/1957 |
| DE | 199 22 356 A1 | 11/2000 |
| DE | 201 17 873 U1 | 3/2002 |
| DE | 103 04 814 B3 | 11/2004 |
| EP | 0 776 711 A1 | 6/1997 |

(Continued)

*Primary Examiner*—John J Zimmerman
(74) *Attorney, Agent, or Firm*—Laurence A. Greenberg; Werner H. Stemer; Ralph E. Locher (57) ABSTRACT

A metal sheet having a microstructure relieved of notching, a carrier body having a plurality of sheets, and an exhaust system having the carrier body, are distinguished by a particularly long useful life in an automobile. Moreover, it is possible to bring about flow profiles coordinated exactly with the respective fields of use, so that a particularly efficient or extremely adaptable carrier body for purifying the exhaust gas of automobiles is provided.

31 Claims, 6 Drawing Sheets

FOREIGN PATENT DOCUMENTS

| | | |
|---|---|---|
| JP | 2002-224752 | 8/2002 |
| RU | 508302 | 3/1976 |
| WO | WO 91/01178 | 2/1991 |
| WO | 00/70206 | 11/2000 |
| WO | 01/79670 A1 | 10/2001 |
| WO | 01/80978 A1 | 11/2001 |

* cited by examiner

METAL SHEET HAVING A MICROSTRUCTURE RELIEVED OF NOTCHING, CARRIER BODY HAVING A PLURALITY OF SHEETS, AND EXHAUST SYSTEM HAVING THE CARRIER BODY

CROSS-REFERENCE TO RELATED APPLICATIONS

This is a continuation, under 35 U.S.C. §120, of copending German Application 103 24 889.1, filed May 30, 2003, which designated the United States; this application also claims the priority, under 35 U.S.C. §119, of International Patent Application No. PCT/EP2004/005766, filed May 28, 2004; the prior applications are herewith incorporated by reference in their entirety.

BACKGROUND OF THE INVENTION

Field of the Invention

The present invention relates to a metal sheet, in particular for use as a carrier body for a catalytically active material for the purification of exhaust gases from mobile internal combustion engines. The metal sheet has at least one slit that extends only in an inner region of the metal sheet and at least partially delimits a microstructure of the metal sheet. The microstructure projects out of a surface structure of the metal sheet. The invention also relates to a carrier body having a plurality of sheets, and an exhaust system having the carrier body.

In the treatment of exhaust gas from mobile internal combustion engines such as, for example, gasoline and diesel engines, it is known that components or structures which provide a relatively large surface may be placed in the exhaust gas line. Those components are conventionally provided with an adsorbing, catalytically active or similar coating, with intimate contact with exhaust gas flowing past being implemented due to the large surface of the components. Such components are, for example, filter elements for filtering out particles containing the exhaust gas, adsorbers for the at least time-limited storage of pollutants (for example, $NO_x$) contained in the exhaust gas, catalytic converters (for example, three-way catalytic converters, oxidation catalytic converters, reduction catalytic converters, etc.), diffusers for influencing the flow or the swirling of the exhaust gas flowing through, or else heating elements which heat the exhaust gas to a predetermined temperature just after the cold starting of the internal combustion engine. In light of the conditions of use in the exhaust system of an automobile, basically the following carrier substrates have proved appropriate: ceramic honeycomb bodies, extruded honeycomb bodies and honeycomb bodies formed of metal sheets. Due to the fact that such carrier substrates always have to be adapted to their functions, metal sheets resistant to high temperature and to corrosion are especially suitable for serving as initial material.

It is known to produce honeycomb bodies with a plurality of at least partially structured metal sheets which are subsequently introduced into a housing and thus form a carrier body that may be provided with one or more of the above-mentioned coatings. The at least partially structured metal sheets in that case are disposed in such a way that channels or ducts disposed substantially parallel to one another are formed. In order to ensure that, for example, some of the metal sheets are provided with a primary structure or surface structure which is distinguished, inter alia, by a regular repetitive structure, in particular a kind of sinusoidal undulation, a sawtooth structure, a rectangular undulation, a triangular undulation, an omega undulation or the like. Those metal sheets provided with a primary structure are then stacked one on the other (if appropriate, alternating with smooth intermediate layers), are connected to one another and are introduced into a housing. A honeycomb body is thereby formed which has channels or ducts substantially parallel to one another.

It is known, further, to introduce a second structure into metal sheets of that kind which is intended, in particular, to prevent the formation of a laminar flow directly after entry of the exhaust gas into the honeycomb body. A gas exchange of regions of the partial exhaust gas stream which lie in the center of such a channel or duct with the, for example, catalytically active channel or duct wall regions, does not take place. That secondary structure or microstructure therefore provides inflow surfaces which result in a kind of swirling of the partial exhaust gas streams inside such a channel or duct. That leads to an intensive mixing of the partial exhaust gas streams themselves, so that intimate contact with the pollutants contained in the exhaust gas with the channel or duct wall is ensured. Furthermore, it is possible, through the use of such secondary structures, to form flow passages transversely with respect to the channel or duct, which allow a gas exchange of partial exhaust gas streams in adjacent channels or ducts. For that reason, secondary structures are known which include, for example, guide surfaces, microstructures, bosses, projections, wings, tabs, holes or the like. That, to an extent, results in a markedly increased diversity of variation in the production of such metallic honeycomb bodies, as compared with those formed of ceramic material, since, in that ccase, such a complex channel or duct wall cannot be implemented or can be implemented only at a particularly high outlay in technical terms.

Further, in the treatment of exhaust gas, it is particularly useful if a conversion of the pollutants contained in the exhaust gas takes place virtually immediately after the starting of the engine. In that case, according to the statutory provisions or directives, that should take place with particularly high effectiveness. For that reason, increasingly thin metal sheets have been used in the past. The result of very thin metal sheets is that there is a very low surface-specific heat capacity. That is to say, relatively little heat is extracted from the exhaust gas flowing past or the metal sheets themselves experience a temperature rise relatively quickly. That is important because the catalytically active coatings used at the present time in the exhaust system begin to convert the pollutants only from a specific light-off temperature which lies approximately around temperatures of 230° C. to 270° C. Metal sheets have been used which have a sheet thickness that, for example, is smaller than 20 μm, with the aim of converting the pollutants with at least 98% effectiveness even after a few seconds.

The above-mentioned objectives, however, result in a series of problems with regard to manufacture and to use. The production of such filigree structures, in particular secondary structures or microstructures, requires tools which operate especially accurately and which are normally very costly, and therefore they should have long service lives. It must be remembered, in this context, that, on one hand, forming and, on the other hand, if appropriate, also separating manufacturing steps have to be carried out. In order to save tool costs, as many machining steps as possible have been integrated into one tool, and because of the configuration of the secondary structure an increasing wear was to be seen on the tool. Furthermore, there is the problem that the relatively thin metal sheets have to be supplied at a suitable speed, if possible without being exposed to undesirable cold forming. Strain hardening may adversely influence the forming behavior of the metal sheet.

Moreover, due to the small material thickness, there is the risk that the metal sheet tends to crease, to roll up and/or to tear. Those undesirable deformations may occur or be intensified even during production as well as during transport or during use in an exhaust system of an automobile. The result of creases, for example, is that, under certain circumstances, channels or ducts are blocked or cracks are formed which are propagated as a result of the high thermal and dynamic loads in the exhaust system of an automobile and therefore put the structural integrity of the honeycomb body at risk. Furthermore, it must be remembered that primary and/or secondary structures creased or deformed in that way present opposition to the exhaust gas in an undesirable way, so that, under certain circumstances, an increased dynamic pressure upstream of the honeycomb body is to be noted, which may possibly lead to a reduction in engine power.

SUMMARY OF THE INVENTION

It is accordingly an object of the invention to provide a metal sheet having a microstructure relieved of notching, a carrier body, in particular for a catalytically active material, having a plurality of sheets, and an exhaust system having the carrier body, which overcome the hereinafore-mentioned disadvantages of the heretofore-known products and devices of this general type, in which the carrier body can permanently withstand the high thermal and dynamic loads in the exhaust system of an automobile and in which the metal sheet, although having a complex construction and being provided with a large relatively rigid surface, is nevertheless highly durable. In particular, it is to be ensured that the structures of the metal sheet inside the carrier body are preserved as far as possible for a long period of time in use, in order to thereby provide a particularly effective device for the purification of exhaust gases.

With the foregoing and other objects in view there is provided, in accordance with the invention, a metal sheet, comprising an inner region and a surface structure. At least one slit is disposed in the inner region. The at least one slit has at least one edge region and a recess in the at least one edge region. A microstructure is at least partially delimited by the at least one slit. The microstructure projects out of the surface structure.

It may be pointed out, in the first place, that a plurality or multiplicity of slits may be located in the metal sheet, at least one extending into an inner region of the metal sheet. That is to say in particular, the slit is not in contact with the edge of the metal sheet, hence is bordered by the material of the metal sheet. It is also possible, however, for the slit to be constructed in a more complex way, that is to say in which it does not extend in only one direction (instead of I-shaped, for example, V-shaped, W-shaped, T-shaped, X-shaped or shaped in a similar way), although then at least two and preferably all edge regions of the complex slit are provided with a recess. Such a slit, lying particularly completely in the inner region of the metal sheet, is introduced into the material, in order, on one hand, to allow fluid exchange through the metal sheet itself, and, on the other hand, to enable the slit to also serve for the formation of microstructures or secondary structures, such as are described in the introduction hereto. The term "microstructures" is to be understood to also mean, in particular, protuberances, crimpings, upbends or the like which, as a rule, are delimited locally in or on the metal sheet. The microstructures may also form, for example, bosses, wings, cants or similar structures. The microstructure serves, inter alia, for influencing a fluid flow routed along the surface of the metal sheet, thus giving rise to swirling and calming zones in which a kind of turbulent flow or a reduced flow velocity is generated with respect to the fluid. With regard to the action or configuration of such microstructures, reference may be made, for example, to International Publication No. WO 01/80978 A1, corresponding to U.S. Patent Application Publication No. US 2003/0072694 A1, the content of which is incorporated in full into the subject matter of the disclosure of the instant application.

Moreover, in addition to this microstructure, the metal sheet has what is known as a surface structure or primary structure. What is meant by this is that the metal sheet itself is not planar, but has an overriding structure. As is known, metal sheets which are used as carrier bodies for catalytically active material in the exhaust system of automobiles are provided with a surface structure which forms a multiplicity of channels or ducts when this metal sheet is assembled together with other metal sheets to form a carrier body. Conventionally, these surface structures have a wave-like or zigzag-shaped structure. Where the wave shapes or forms are concerned, for example, a kind of sinusoidal undulation or an omega-shaped undulation has proved particularly appropriate. These surface structures extend, as a rule, over the entire length of the metal sheet or of the resulting carrier body. Under certain circumstances, continuous or abrupt changes in the height or in the width of the surface structure over the lengths are also known. In summary, therefore, it is to be assumed, herein, that the surface structure serves for forming channels or ducts in an axial direction of the carrier body through which a fluid is capable of flowing, while the microstructure is intended, foremost, to bring about an influencing of the flow inside these channels or ducts formed by the surface structure. It is therefore to be assumed that the microstructures are constructed in such a way that they extend into the inner region of such a channel or duct and, of course, are not made larger or higher than the channel or duct allows. Depending on the form of the channel or duct, the microstructure may extend from any desired point into the inner region, that is to say both from a bottom face and from the side faces or else from a ceiling region.

According to the invention, it is proposed that the slit have a recess in at least one edge region. Preferably, all of the edge regions of the slit have a recess, in particular with the same configuration of the recess. Conventionally, the slit has a linear (I-shaped) configuration. This means that the edge regions normally terminate in a point or with an extremely small radius (for example, smaller than 0.05 mm). Such a slit is conventionally produced by stamping since the manufacturing method and has a straight (I-shaped) run.

In order to produce the microstructures, that region of the metal sheet which is located directly in the vicinity of the slit is bent up through the use of suitable tools, so that, for example, guide surfaces are obtained. As a result of this bending operation, the material in the edge region around the slit is subjected to high stress. Thus, for example, strain-hardening processes may lead to a changed thermal and dynamic behavior of the metal sheet around the slit. The sometimes considerable loads which act on such a guide surface or the metal sheet during use in the exhaust system of an automobile may result in pronounced notching in the edge region of the slit. A crack which, starting from this edge region of the slit, would be propagated further into the material of the metal sheet, would put the entire functionality of the carrier body at risk, and detached fragments might even be accelerated considerably due to the exhaust gas stream flowing through and impinge onto the following components for exhaust gas purification. There, too, they would block the channels or ducts, clog pores, strip off material, destroy coatings or the like.

Such effects are reliably avoided by the provision of recesses in at least one edge region of the slit. These recesses have a relatively large radius, so that a notch effect does not arise even in sometimes considerably deformed regions of the metal sheet. Preferably, the slit has such a recess on each of its edge regions. In this case, it is also conceivable that, for example, crossed slits are provided, with such a recess being provided at the respective end regions. The recess means, in other words, a widening of the linear slit, so that a wider slit is provided in the end regions. Round cross sections, wider grooves with rounded end sides or flanks, undercuts or similar shapes are appropriate for this purpose. Further, the recess may also be constructed in the form of one or more buckled or angled end region of the slit. In this case, it is also possible for the edge regions to be configured with different shapes relating to the recess. The production of such slits with recesses can be carried out in a simple way through the use of separating manufacturing methods such as, for example, (laser beam) cutting, stamping, spinning or similar methods for the separation of metal sheets.

In accordance with another feature of the invention, the surface structure of the metal sheet has a wave-like or corrugated configuration with wave crests and wave troughs extending in a longitudinal direction. A wave-like configuration also embraces, in particular, a sinusoidal form which can be seen when the metal sheet is viewed from one edge. The wave crests or wave troughs preferably extend over the entire axial length of the metal sheet, and they preferably run substantially parallel to one another.

In accordance with a further, particularly advantageous feature of the invention, the wave-like configuration can be described by a wavelength and a wave height. The ratio of wavelength to wave height lies in a range of 3.0 to 1.0, in particular in a range of 2.5 to 1.1 or preferably in a range of 2.0 to 1.3. The terms wave crest and wave trough, as a rule, respectively mean the highest and the lowest point of the wave-like configuration. The wavelength in this case designates the distance between two directly adjacent identical extremes of the surface structure such as, for is example, between two directly adjacent wave crests or between two directly adjacent wave troughs. The wave height describes the height difference between two different extremes, that is to say, for example, the height difference from wave crest to wave trough. As a result, the wave height and wavelength are measured perpendicularly to one another. In this case, it may be pointed out that, basically, deviations with regard to wave height or to wavelength occur which are unavoidable for manufacturing reasons. The characteristic values specified herein thus constitute a statistical mean value, and manufacturing tolerances always have to be remembered.

The ratio of wavelength to wave height specified herein also describes the degree of deformation of the metal sheet. If it is assumed that the metal sheet is in the first place substantially planar, and the surface structure is subsequently introduced, for example through the use of a wave-rolling method, then a low ratio of wavelength to wave height, for example lower than 2.0, means that the wave crests or the wave troughs are disposed relatively closely next to one another, while the height difference from wave crest to wave trough is relatively large. As a result, relatively slender channels or ducts are formed, which have sides or flanks running very steeply. Precisely where so highly deformed metal sheets are concerned, there is the risk of material fatigue, even during production, so that, for example in the case of increasing wear of the tool, cracks may even arise which may subsequently spread. Consequently, precisely for such metal sheets, it is particularly useful to provide recesses in the edge regions of the slits.

In accordance with an added feature of the invention, the microstructure includes a guide surface which is set or flared out from the surface structure of the metal sheet, in particular obliquely in the longitudinal direction. An angle which lies in a range of 10° to 35° is preferably formed. Such a guide surface is particularly suitable for peeling off partial flows on the surface of the metal sheet and steering them toward desired regions. Such a guide surface may also be gathered in detail from German Utility Model 201 17 873 U1, corresponding to U.S. Patent Application Publication No. US 2004/0013580 A1, the content of the disclosure of which is incorporated herein in full by reference.

In accordance with an additional feature of the invention, the metal sheet has two slits which in each case at least partially delimit a microstructure. This means, in other words, that at least one of the microstructures is delimited in two directions by a pair of slits, and that region of the metal sheet which lies between them is set out, pressed out or otherwise deformed with respect to the general surface structure. In this case, as a rule, surfaces are formed which, for example, are not oriented so obliquely with respect to the direction of flow of the exhaust gas, that a lower diversion of the gas stream is brought about in this case. This may result in an advantageous effect on the pressure loss which is generated, because such microstructures present lower flow resistance.

In accordance with yet another feature of the invention, the at least one recess has a rounded shape, in particular an arc of a circle with a radius of curvature. The radius of curvature preferably amounts to at least 0.1 mm. Tests have shown that, with a radius of curvature larger than 0.1 mm, in particular larger than or equal to 0.2 mm, crack formation or crack propagation, starting from the slits, is markedly reduced. The cause of this is, inter alia, a markedly reduced material stress of the metal sheet during use, which is sometimes only in the region of less than 30%, as compared with the simple slit. A reduced stress in the edge regions of the slit prevents the formation of cracks.

In accordance with yet a further feature of the invention, there is provided a multiplicity of microstructures, which are disposed in lines parallel to the longitudinal direction of the metal sheet and/or in rows transvers to the longitudinal direction. The microstructures are preferably disposed in such a way that they are located on the wave crests or in the wave troughs. The microstructures disposed on the wave crests extend toward the wave troughs, and the microstructures disposed on the wave troughs extend toward the wave crests. That is to say, in other words, that the microstructures are disposed within two planes which are defined in each case either by the wave crests or by the wave troughs when such a metal sheet is positioned flat on a planar base. The microstructures are later disposed thus inside the flow channels or ducts in the case of a carrier body. With regard to their configuration in relation to one another, it may also be pointed out that, if appropriate, an offset of the lines or rows over the length or width of the metal sheet is also possible.

In accordance with yet an added feature of the invention, the metal sheet is formed from a steel which contains aluminum and chromium and which has high thermal load-bearing capacities and is corrosion-resistant. The metal sheet preferably has a metal sheet thickness in a range of 0.015 to 0.15 mm, in particular in a range of 0.03 to 0.08 mm. Alternatively thereto, it is basically also possible to use a metal sheet which has a nickel base or alloys thereof. The materials specified herein have proved appropriate precisely for use under the aggressive conditions in the exhaust system of an automobile. The metal sheet thickness in this case is to be selected as a function of the place of use or of the intended use of the metal sheet in the exhaust system. It is to be noted, in principle, that a higher metal sheet thickness represents an increased heat capacity, so that such metal sheets may also be used, for example, as heat storage devices. Furthermore, the increased sheet thickness also results, of course, in increased stability, so that these metal sheets can be exposed to particularly high dynamic loads. The relatively thin metal sheets in the range of 0.015 to approximately 0.05 mm have only a relatively low heat capacity, so that these sheets, for example, adapt quickly to the ambient temperature. This means that, after the cold starting of the internal combustion engine, these are heated quickly by the exhaust gas flowing past and therefore make it possible to quickly activate the catalyst adhering to them.

In accordance with yet an additional feature of the invention, the microstructure has a maximum extent out of the surface structure which lies in a range of 0.3 to 0.95 (30%-95%) of the wave height, preferably in a range of 0.5 to 0.8 (50%-80%) of the wave height. That is to say, in other words, that the microstructure stands out from the surface structure of the metal sheet in a clearly perceivable way. It is only in this way that the exhaust gas quantity flowing past the metal sheet in a normally laminar flow can be transformed into a turbulent flow.

With the objects of the invention in view, there is also provided a carrier body for a component for the purification of exhaust gases. The carrier body comprises a plurality of at least partially structured metal sheets being stacked and/or wound to permit a fluid to flow through the carrier body. At least one of the metal sheets is a metal sheet according to the invention as described above.

In accordance with another feature of the invention, the carrier body has a multiplicity of channels or ducts which extend substantially in a longitudinal direction and which are at least partially formed by the surface structure of the metal sheet. The at least one microstructure preferably influences the flow of the fluid, so that the fluid, when it flows through the carrier body, is steered toward adjacent channels or ducts. In other words, therefore, flow influencing takes place in a direction which is at least partially oblique or perpendicular to the longitudinal direction of the channels or ducts or to the main flow direction of the exhaust gas. The microstructure may in this case also have a plurality of measures for flow influencing. Thus, it is possible for the microstructure to be formed by a guide surface which brings about a defined deflection of the exhaust gas, for example through the use of bosses, orifices, steps, upsets or the like.

In accordance with a further feature of the invention, the carrier body has a channel or duct density in a range of 100 to 1,000 cpsi (cells per square inch; 6.45 channels or ducts per square inch corresponds to 1 channel or duct per square centimeter), preferably in a range of 300 to 600 cpsi. In this case, the metal sheets preferably have a ratio of wavelength to wave height which lies in a range of 2.0 to 1.3.

In accordance with an added feature of the invention, the carrier body has, at least in a partial region (in the longitudinal direction), a uniform distribution of microstructures over a cross section perpendicular to the longitudinal direction. The multiplicity of channels or ducts are preferably oriented in the longitudinal direction of the carrier body which coincides substantially with the main flow direction of the exhaust gas through the carrier body. If a cross section perpendicular thereto is considered, then, the channels or ducts can be perceived as a kind of honeycomb structure. In light of such a cross section, then, it is proposed that there be a uniform distribution of microstructures (in the statistical sense). This means, in other words, that there is substantially the same distance toward adjacent microstructures and/or that in each case only a specific number of channels or ducts are disposed per unit of cross-sectional area. This results in a particularly symmetrical load on the metal sheet or on the carrier body, so that stress peaks can be reduced in this case.

In accordance with an additional feature of the invention, a multiplicity of microstructures is disposed in a cross section perpendicular to the longitudinal direction of the carrier body. These microstructures are configured in such a way that the fluid flowing through is deflected partially in different directions. What is meant thereby is, in particular, that a radially outward deflection can take place through the use of the microstructures in one partial region of the cross section, while a deflection of the fluid or exhaust gas into an opposite direction running obliquely thereto or a skew direction can take place in an adjacent partial region of the cross section.

The orientation of the microstructures or the resulting deflection of the fluid flowing through the carrier body is also codetermined substantially by the configuration of the metal sheet in the carrier body itself. Thus, where spirally wound metal sheets are concerned, as a rule, only deflections in a radial direction take place, whereas, in the case of stacked or simply bent, involute, S-shaped or similar configurations of the metal sheets, different orientations of the microstructures in adjacent regions are possible. This results in a markedly more complex flow mixing pattern.

In accordance with still another feature of the invention, the carrier body includes, in addition to the at least one metal sheet, at least one element from the following group of elements:

at least one smooth metal layer which, in particular, bears substantially against the extremes of the surface structure of the metal sheet, and preferably is connected thereto;

at least one porous fiber layer which, in particular, bears substantially against the extremes of the surface structure of the metal sheet, and preferably is connected thereto;

at least one housing which surrounds the carrier body at least in a portion;

at least one sleeve which surrounds the carrier body at least in a connection or tie-up region and serves for connection or tying up to a housing;

at least one coating which is provided in at least one sector of the carrier body; and at least one measuring device.

With regard to the smooth metal layer, it must be mentioned that, as is known, smooth metal layers and structured metal sheets are stacked alternately with one another and thus in each case delimit channels or ducts. Such a stack of smooth metal layers and structured metal sheets is subsequently wound or bent in such a way that they are given the cross section of the desired carrier body form. Known carrier body forms are round, oval, polygonal as well as cylindrical, conical or rectangular configurations.

The provision of a porous fiber layer is appropriate particularly when such a carrier body is used as the filter for particles or other solid, liquid or gaseous constituents in the exhaust gas stream. At this juncture, too, reference may be made to German Utility Model 201 17 873 U1, corresponding to U.S. Patent Application Publication No. US 2004/0013580 A1, the content of the disclosure of which is also presented herein with respect to the porous fiber layer.

All known technical joining manufacturing methods are considered in general as a technique for connecting the smooth metal layer or the porous fiber layer to the metal sheet, but welding or brazing is preferably proposed herein. The preferred manner of producing the technical joining connection is by brazing. However, a sintering process or even welding may be used as well.

A sleeve provides an additional sheet which surrounds the carrier body or the stack of metal sheets about a circumference and which serves for connecting or tying up to a housing. A direct technical joining connection from the metal layers or metal sheets forming the channels or ducts toward the housing is thus prevented. In order to explain the function of the sleeve, reference may be made, for example, to International Publication No. WO 01/79670 A1, corresponding to U.S. Patent Application Publication No. US 2003/0007906 A1, the disclosure content of which is fully incorporated herein.

The coating is to be selected in each case in dependence on the function of the carrier body. Thus, coatings are known which bring about a catalytic conversion of pollutants that are contained in the exhaust gas and which are formed substantially by precious metals or rare earths. Furthermore, coatings are customary which assume a kind of storage function, in particular with regard to nitrogen oxides. It is also possible for the coating to be used for a further enlargement of the surface of the metal sheet, with a washcoat normally being employed. The statement that such a coating is provided at least in a sector of the carrier body means, in particular, that the carrier body:
- is constructed with different coatings (for example, with regard to type, layer thickness, surface roughness, etc.) and/or
- is provided even only partially with a coating, in which case this sector may be located in the inner region of the carrier body without contact with the circumferential surface and (additionally or alternatively) may extend over only part of the axial length.

The provision of a measuring device, in particular of sensors or the like, serves, for example, for checking the functionality of the carrier body. The sensors used are often, inter alia, what are known as lambda probes or also temperature sensors. A measurement value located in the exhaust gas or present in the carrier body is normally transferred through the housing toward an engine control or another control or regulating unit.

With the objects of the invention in view, there is additionally provided, in an exhaust system, a component, comprising a carrier body according to the invention as described above, for purification of exhaust gases. The component is selected from the group consisting of a catalytic converter, a flow mixer, an adsorber, and a particle trap.

The various fields of use or structures for catalytic converters, flow mixers, adsorbers or particle traps are known to a person skilled in this art, so that, as a rule, it is possible in a simple way for him or her to adapt the carrier bodies described herein to the respective tasks as components in the exhaust system. Since the thermal and dynamic loads for the carrier body are always high and crack propagation with regard to the slits for the microstructure can be markedly reduced in this manner, all of the above-mentioned components have a markedly prolonged useful life. The statutorily required limit values with regard to exhaust gas purification can thus be maintained for a long time without high maintenance or repair costs.

Other features which are considered as characteristic for the invention are set forth in the appended claims.

Although the invention is illustrated and described herein as embodied in a metal sheet having a microstructure relieved of notching, a carrier body having a plurality of sheets, and an exhaust system having the carrier body, it is nevertheless not intended to be limited to the details shown, since various modifications and structural changes may be made therein without departing from the spirit of the invention and within the scope and range of equivalents of the claims, in which the features recited individually therein can be combined with one another in any appropriate way desired.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2.1 is a fragmentary, perspective view of a microstructure with a slit without a recess;

FIG. 2.2 is a fragmentary, perspective view of a microstructure with a slit which has a first exemplary embodiment of a recess;

FIG. 2.3 is a fragmentary, perspective view of a microstructure with a slit which has a further exemplary embodiment of a recess;

DESCRIPTION OF THE PREFERRED EMBODIMENTS

Figure 1:
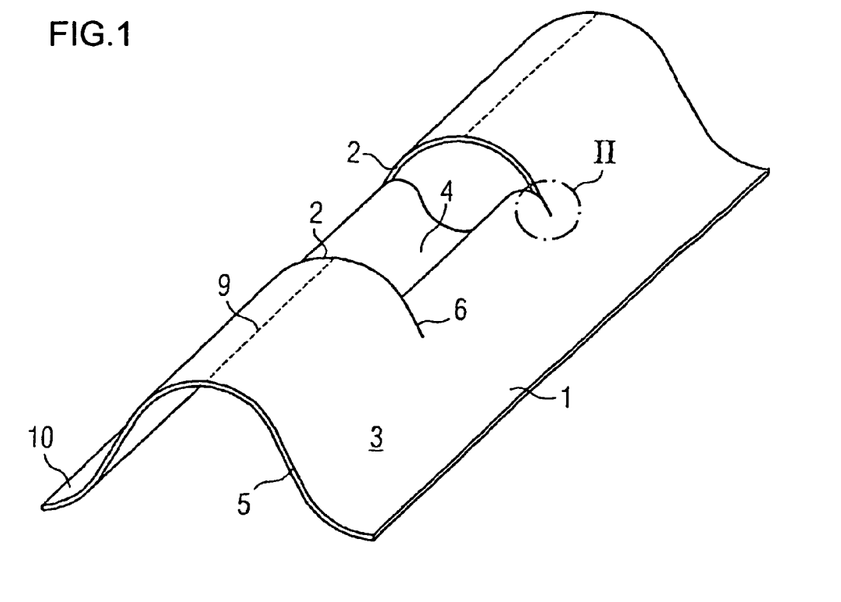
FIG. 1 is a diagrammatic, perspective view of a portion of a metal sheet with a microstructure.

Referring now to the figures of the drawings in detail and first, particularly, to FIG. 1 thereof, there is seen a diagrammatic and perspective view of part of a metal sheet 1 with a microstructure 4. In this illustrated portion, the metal sheet 1 includes a microstructure 4 which is partially delimited by two slits 2. These slits 2 extend only into an inner region 3 of the metal sheet 1. The microstructure 4 projects out of a surface structure 5 of the metal sheet 1. The surface structure 5 is constructed with wave crests 9 and wave troughs 10. As indicated by reference numeral 11, edge regions 6 of the slits 2 are illustrated in an enlarged manner in the following FIGS. 2.1, 2.2 and 2.3.

Figure 21:
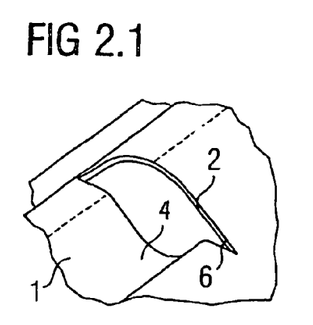
Figure 22:
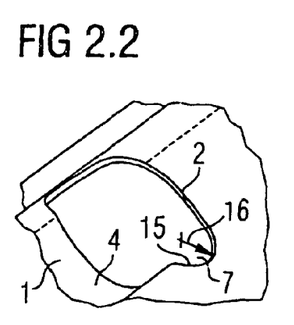
Figure 23:
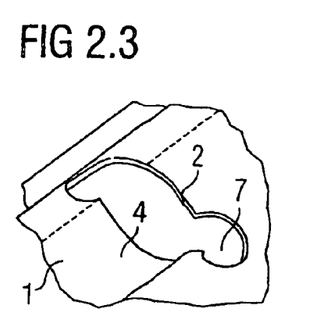

FIGS. 2.1, 2.2 and 2.3 show views of a portion of a microstructure 4 which is delimited by a slit 2. The slit 2 makes it possible for the microstructure 4 to be formed from the metal sheet 1 in such a way that the microstructure emerges from the surface structure 5. FIG. 2.1 in this case illustrates the edge region 6 as a simple slit 2, that is to say without a recess 7 according to the invention. Tip transitions in the edge region 6 constitute a notch, so that during a relative movement of the microstructure 4 with respect to the metal sheet 1, a continuing widening of the slit 2 may take place in the edge region 6. Entire microstructures 4 may therefore ultimately be loosened from the metal sheet 1. In order to avoid something such as that occurring, recesses 7 are provided in the edge region 6 of the slit 2, as is illustrated by way of example in FIGS. 2.2 and 2.3. The recess 7 in FIG. 2.2 forms an arc of a circle 15 with a radius of curvature 16 which preferably lies in the range of 0.2 mm to 0.4 mm. In FIG. 2.3, the recess 7 is illustrated as an undercut. Other forms of the recess 7 which reduce the notch effect may likewise be employed.

Figure 3:
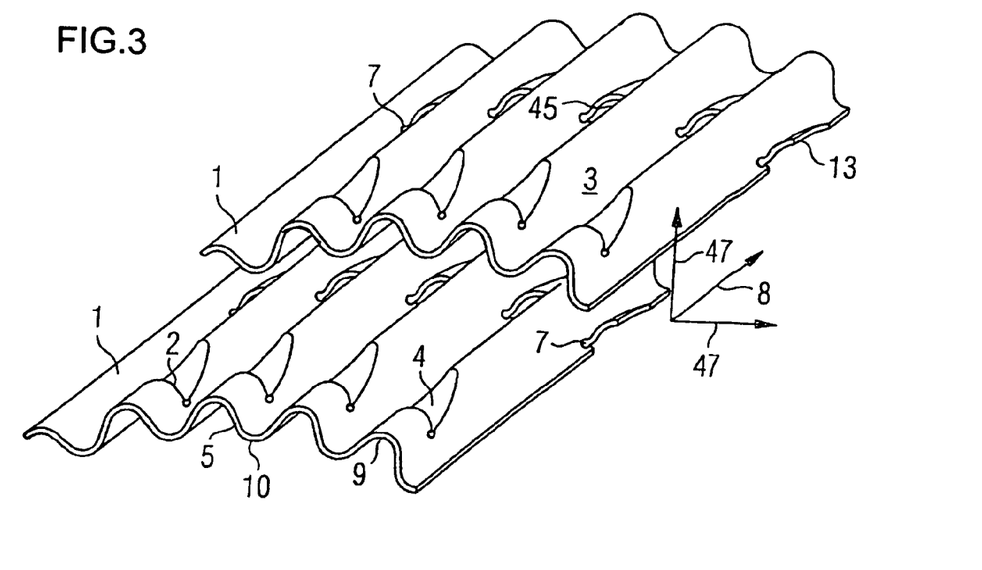
FIG. 3 is a reduced perspective view showing the construction of a carrier body with a first embodiment of the metal sheets.

FIG. 3 is a diagrammatic and perspective view of a configuration of two metal sheets 1 with microstructures 4 which can be assembled to form a carrier body according to the invention. The metal sheets 1 again have the surface structure 5 with wave crests 9 and wave troughs 10 which extend preferably over the entire length in longitudinal direction 8. The microstructures 4 of the metal sheet 1 are disposed "reciprocally" and "equidirectionally". In this respect, "reciprocally" means that the microstructures 4 extend alternately upward and downward (with respect to the surface structure 5 of the metal sheet 1), as is seen in the longitudinal direction 8. In addition, in this respect, "equidirectionally" means that the slits 2 which delimit the microstructure 4 point in one (common) direction, that is to say precede the microstructure 4 or delimit the latter upstream. The microstructures 4 are formed as guide surfaces 13 with an orifice 45. The guide surfaces 13 have the effect that the flow running substantially in the longitudinal direction 8 is deflected in transverse direction 47. The recess 7 is also clearly illustrated, enlarged, in the edge regions 6 of the slits 2.

Figure 4:
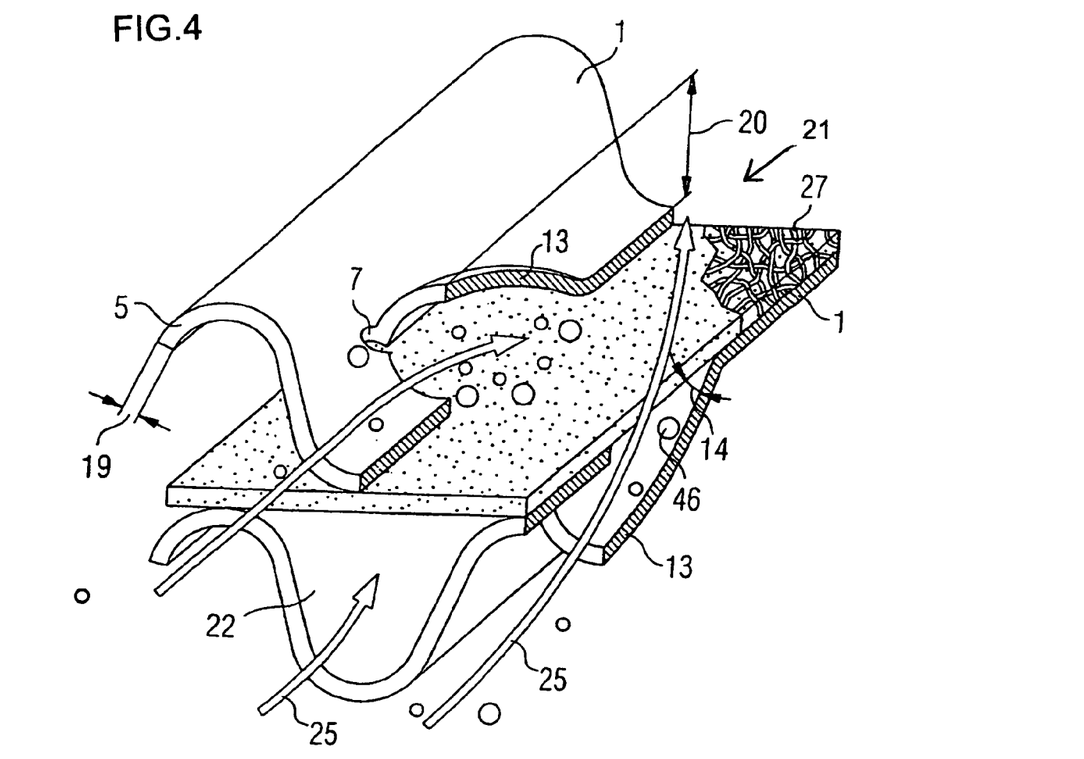
FIG. 4 is a fragmentary, perspective view of a portion of a carrier body including metal sheets with microstructures and a fiber layer.

FIG. 4 shows, in a perspective and sectional-view, a portion of an embodiment of a carrier body 21 as a filter body or particle trap. Two metal sheets 1 disposed adjacent one another are illustrated, between which a fiber layer 27 is disposed. The metal sheets 1 have a multiplicity of guide surfaces 13 to deflect a flow direction, which is illustrated in this case by an arrow 25. This ensures that the exhaust gas, together with particles 46 contained in it, penetrates through the filter layer 27, so that the particles 46 are retained on the surface or inside the fiber layer 27 until they can be converted into gaseous components. For this purpose, discontinuous regeneration (a considerable supply of heat) may be carried out or continuous regeneration according to the CRT method may take place. The dwell time of the particles in the filter body is advantageously prolonged so that the required reaction partners for chemical conversion are present.

The microstructures 4 or guide surfaces 13 are set or flared out of the surface 5 of the metal sheet 1. A configuration which is oblique in the longitudinal direction 8 is illustrated, with an angle 14 being formed which lies in a range of 10° to 35°. The guide surface 13 or microstructure 4 has a maximum extent 20 out of the surface structure 5 which lies in a range of 0.3 to 0.95 of the wave height 12 (shown in FIGS. 8B and 8D). A recess 7 is again provided in the edge region 6 of the slits 2. The metal sheets 1 have a surface structure 5 which forms channels or ducts 22 through which a fluid is capable of flowing in the direction of flow indicated by the arrow 25.

Figure 5:
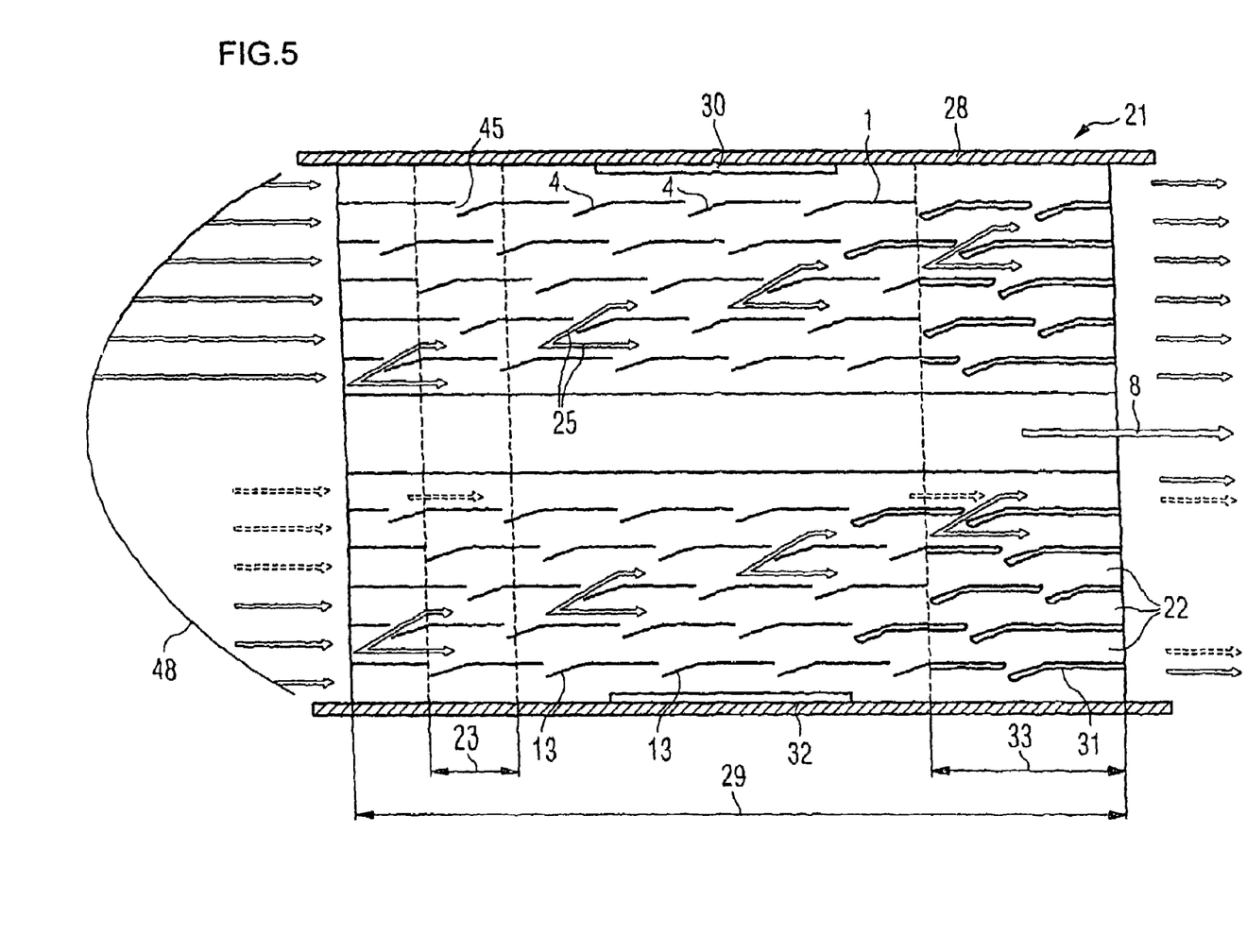
FIG. 5 is an enlarged, longitudinal-sectional view showing the construction of a carrier body.

FIG. 5 is a diagrammatic, longitudinal-sectional view, which shows a carrier body 21 having a plurality of metal sheets 1 that form channels or ducts 22 through which the exhaust gas is capable of flowing in the direction of flow indicated by the arrow 25. The carrier body 21 illustrated herein is constructed as a flow mixer which serves the function of equalizing a flow profile 48 of the oncoming exhaust gas stream. The flow profile is substantially parabolic. The carrier body 21 has a multiplicity of metal sheets 1 with microstructures 4 which form orifices 45, so that the exhaust gas can flow into adjacent channels or ducts 22. In this case, the configuration of the microstructures 4 in the carrier body 21 is selected in such a way that, in a partial region 23 in the longitudinal direction 8, a uniform distribution of microstructures 4 is provided perpendicularly to the longitudinal direction 8 over a cross section 24 (shown in FIG. 6). The metal sheets 1 or the carrier body 21 are or is surrounded in a portion 29 by a housing 28. In this case, the portion 29 includes the entire axial length of the carrier body 21 and the housing 28 and even extends beyond the axial length of the carrier body 21. The metal sheets 1 are connected or tied to the housing 28 through the use of a sleeve 30 which is disposed relatively centrally in a connecting or tying region 32.

The illustrated carrier body 21 or flow mixer furthermore has a sector 33 in which a coating 31 is provided. However, the sector 33 may extend over the entire axial length of the carrier body 21 in exactly the same way as the portion 29.

Figure 6:
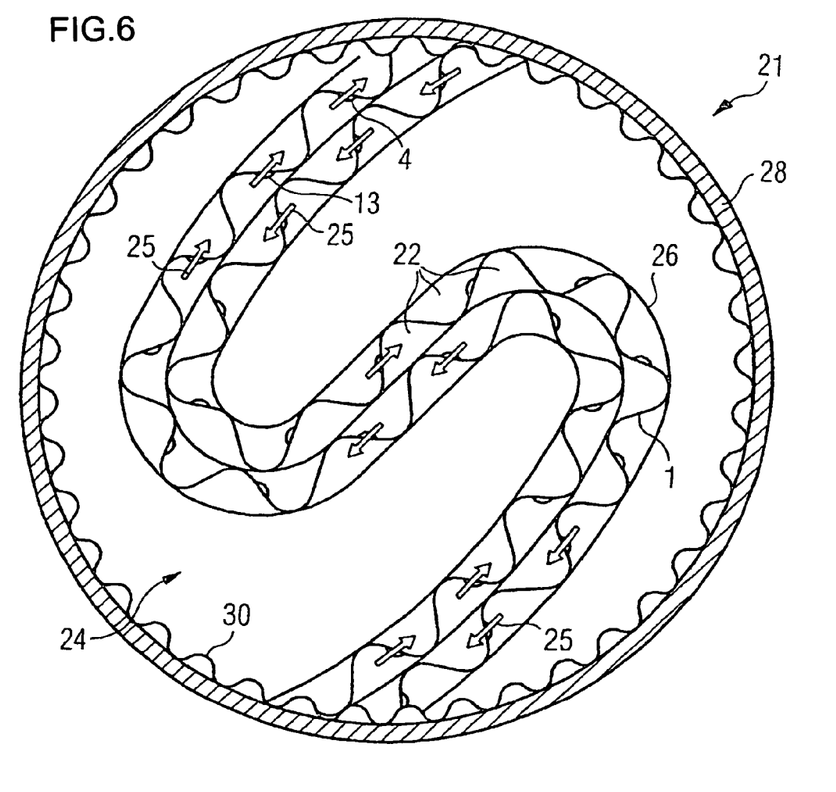
FIG. 6 is a cross-sectional view showing the construction of a further embodiment of the carrier body.

FIG. 6 shows a diagrammatic, cross-sectional view of a further embodiment of a carrier body 21 with a housing 28. The metal sheets 1 in this case are wound in an S-shaped manner, with layers formed of the structured metal sheets 1 and a smooth metal layer 26 being formed. The surface structure 5 of the metal sheet 1 and the smooth metal layers 26 together form channels or ducts 22 into which the microstructures 4 or guide surfaces 13 project. The microstructures 4 or guide surfaces 13 bring about a deflection of the fluid flowing through the carrier body 21, so as to give rise, transversely thereto, in particular within the cross section 24, to transverse flows which are identified in this case by the arrow 25. The ends of (preferably all) the metal layers 26 or metal sheets 1 are connected to the sleeve 30 which likewise has a surface structure 5. The sleeve 30 is disposed over the entire circumference of the outer contour of the carrier body 21. As a result of a partial connection or tying of the sleeve 30 to the housing 28 and of a connection or tying to the metal sheets 1 or metal layers 26 which, if appropriate, is offset (axially and/or in the circumferential direction), the different expansion behavior of the housing 28 and of the metal sheets 1 or metal layers 26 is compensated.

Figure 7:
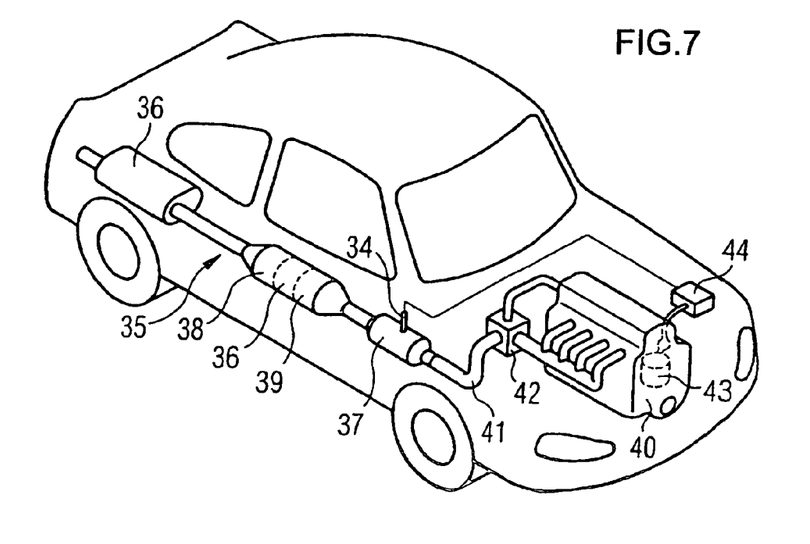
FIG. 7 is a perspective view showing the construction of an exhaust system in an automobile.

FIG. 7 diagrammatically shows the construction of an exhaust system 35 for an automobile. The automobile has an internal combustion engine 40, and the fuel used may be gasoline, diesel, rape or rape oil or other energy carriers. An exhaust gas which is produced in a displacement or piston volume 43 (or combustion chamber), where appropriate, runs through the following components before it is ultimately discharged into the surroundings:

- a turbocharger 42 for compressing intake air for the internal combustion engine 40,
- a flow mixer 37 with a measuring device 34,
- a particle trap 39,
- a catalytic converter 36,
- an adsorber 38,
- a further catalytic converter 36 (for example, a three-way catalytic converter), and
- an exhaust gas line 41 through which the individual components for the purification of the exhaust gas are connected to one another.

In order to influence the combustion operations or the action of the exhaust system 35 or of the internal combustion engine 40, data are transferred to an engine control 44.

FIGS. 8A, 8B, 8C and 8D diagrammatically illustrates the manufacturing steps which may be used in order to produce the metal sheet according to the invention.

Figure 8A:
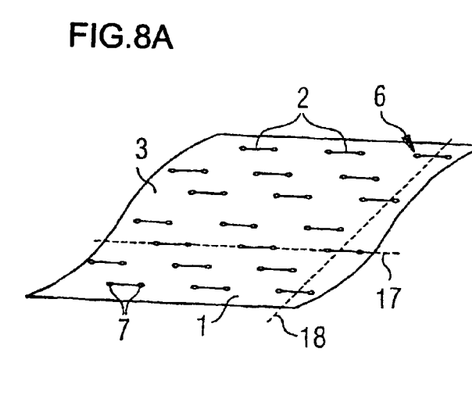
FIGS. 8A, 8B, 8C and 8D are perspective views illustrating the production of an embodiment of the metal sheet according to the invention.

Step (A): As is seen in FIG. 8A, starting from a substantially planar metal sheet 1, slits 2 lying in the inner region 3 of the metal sheet 1 are introduced in rows 18 and/or in lines 17. The slits 2 in this case are configured in such a way that a recess or opening 7 is provided in each of their edge regions 6.

Figure 8B:
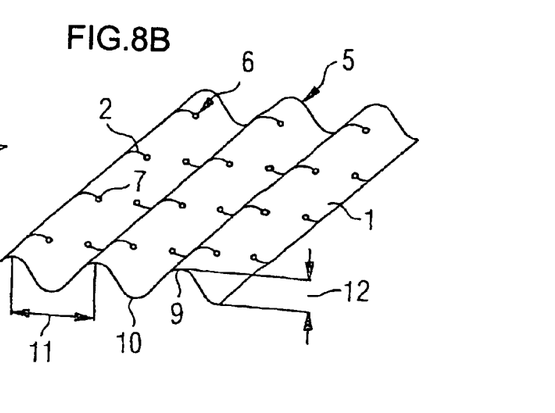

Step (B): As is seen in FIG. 8B, the metal sheet 1 which is thus pretreated is then subjected to a shaping manufacturing method, for example wave-rolling, so that the surface structure 5 is formed. The surface structure 5 illustrated is distinguished by wave crests 9 and wave troughs 10 which are propagated substantially parallel to one another. The surface structure 5 or the wave-like configuration can be described through the use of the parameters of a wavelength 11 and wave height 12. In the illustrated embodiment of the metal sheet 1, the ratio of wavelength 11 to wave height 12 is approximately 3.0.

Figure 8C:
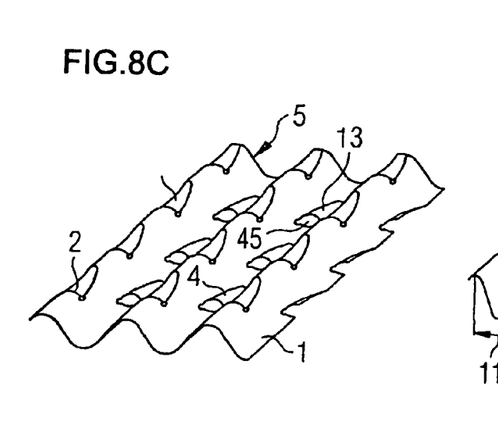

Step (C): As is seen in FIG. 8C, step C shows the metal sheet 1 as it appears after a second shaping manufacturing method for forming the microstructures 4. For this purpose, the slits 2 positioned on the wave crests 9 or in the wave troughs 10 have been provided as a delimitation for the microstructure 4 and upsets have been carried out in the material of the metal sheet 1. The upsets form the guide surfaces 13 with the orifices 45. The guide surfaces 13 extend upward from the wave troughs 10, and the guide surfaces 13 project downward from the wave crests 9.

Figure 8D:
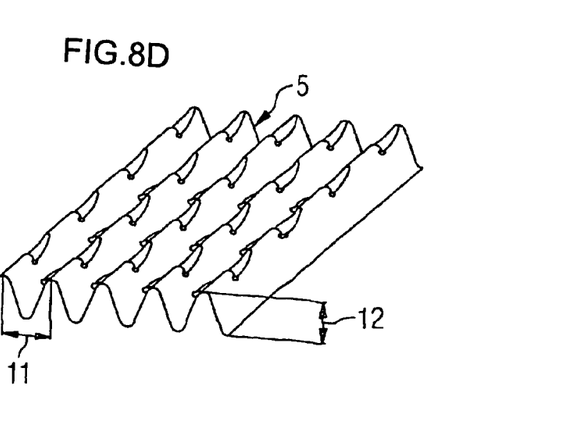

Step (D): As is seen in FIG. 8D, in a last step, a particularly low ratio of wavelength 11 to wave height 12 is formed. In this case, for example, it is possible for the metal sheet 1 to be compressed, so that the surface structure 5 has markedly smaller wavelengths 11. With regard to the production of such metal sheets, reference may also be made to German Patent DE 103 04 814 B3, corresponding to U.S. patent application Ser. No. 11/199,396, filed Aug. 8, 2005.

Figure 9:
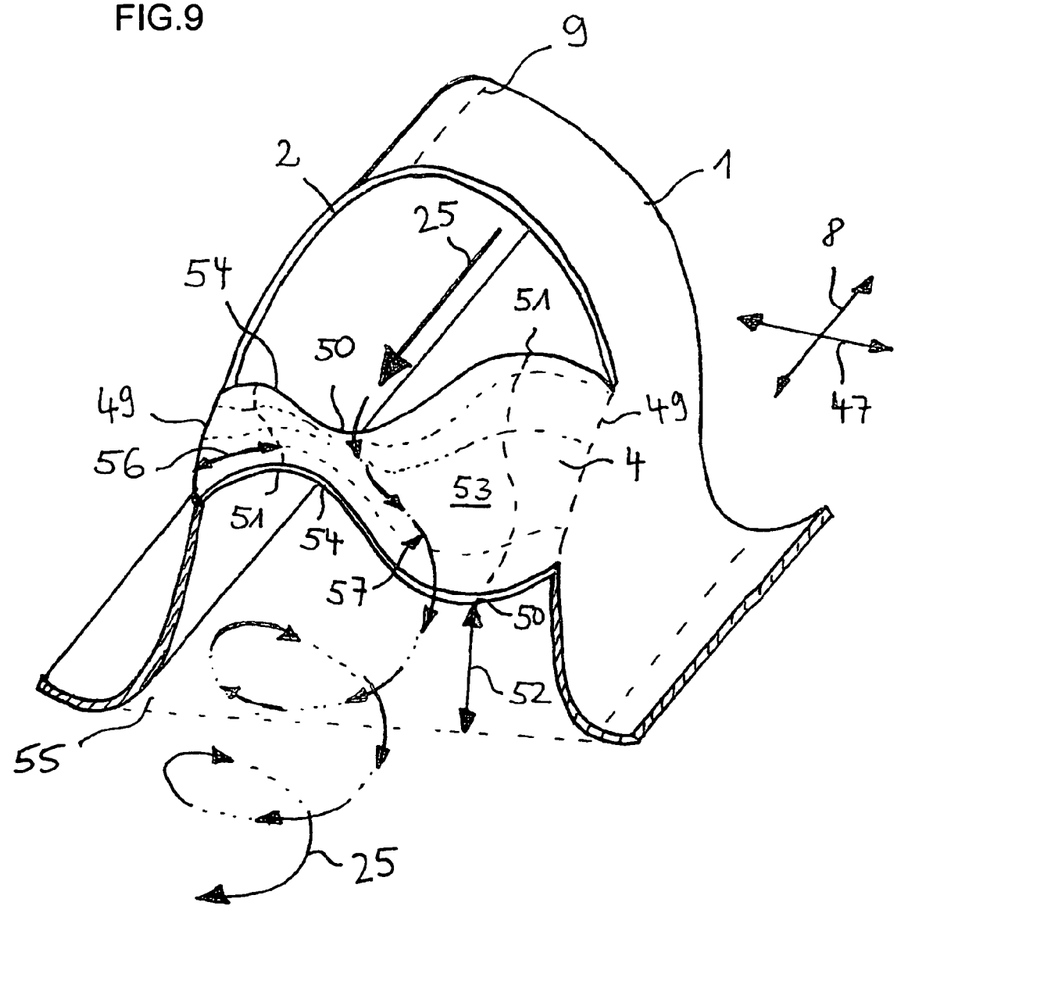
FIG. 9 is a fragmentary, perspective view of a portion of a metal sheet with a microstructure causing a swirl.

FIG. 9 is a diagrammatic and perspective view of a portion of a metal sheet 1 with a microstructure 4 which causes a swirl of the fluid stream (as is indicated diagrammatically by the arrow 25). A metal sheet 1 is shown which includes at least one slit 2 disposed in an inner region 3 of the metal sheet 1. The at least one slit 2 at least partially delimits a microstructure 4 of the metal sheet 1 which projects out of a surface structure 5 of the metal sheet 1 that is distinguished by the microstructure 4 forming a spherical area 53. This area 53 or the surface formed has the property of causing the onflowing fluid or exhaust gas, which often flows in laminar form, to be not (only) simply deflected in one direction, but to have a flow thread which is provided with at least one swirl, rotation or turbulence. Whereas considerable pressure losses are generated in the channel or duct in the case of a predominant deflection of the flow thread toward a channel or duct wall, this is markedly reduced through the use of the helical flow of the fluid in the channel or duct after corresponding excitation by the spherical area 53. It is precisely in automobile construction where pressure loss plays an important part and indeed has a direct influence on engine power. It must be pointed out, at this juncture, that this metal sheet 1 with a microstructure 4 having a spherical area 53 can also be produced independently of the recesses 7 according to the invention in the edge region 6 of the slit 2, and may also be combined advantageously with all aspects of the metal sheets and carrier bodies described herein or may be employed for the same use.

The spherical area 53 can be described, for example, by stating that the microstructure 4 is not planar, but (when a sectional plane parallel to the transverse direction 47, as illustrated in FIG. 9, is considered) has at least one high point 51 and one low point 50. This applies particularly at edges 54 of the microstructure 4. The high points 51 and low points 50 can be distinguished from one another by the amounts of the height 52, in particular meaning local extreme points. The height 52 in this case describes, in particular, a vertical distance to a channel or duct bottom 55 or a plane through the wave troughs 10 of the metal sheet 1.

According to a preferred embodiment, then, the spherical area 53 is shaped in such a way that at least the high points 51 or the low points 50 of various sectional planes (parallel to the transverse direction 47 and through the microstructure 4) are not disposed in alignment in the longitudinal direction 8. This means, for example, that a distance 56 of the high points 51 and/or the low points 50 from a transitional region 49 of the microstructure 4 changes in the longitudinal direction 8.

According to one embodiment, it is also possible that (additionally) high points 51 and low points 50 are provided in at least one sectional plane through the microstructure 4 parallel to the longitudinal direction 8. In other words, in particular, there is no rectilinear run of the microstructure 4. Preferably, in this case too, the distances of the high points 51 and/or the low points 50 from the edges 54 are not identical in all the sectional planes parallel to the longitudinal direction 8.

According to the embodiment illustrated in FIG. 9, the low points 50 form a contour 57 which is distinguished in that it does not run parallel to the longitudinal direction 8, but preferably corresponds to a three-dimensional path which has at least portions transverse to the longitudinal direction 8. This contour 57 preferably constitutes a continuous path, that is to say it has no corners, edges, etc. The contour 57 advantageously has a varying height 52 along its run. It is particularly advantageous if the contour 57 starts, with a first height 52 and a first distance 56 from the transitional region 49 disposed nearest, at the edge 54 onto which the fluid flows, and finally, at the other edge 54, has a second distance 56 which is greater. In particular, there too, the contour 57 has a second height 52 which is different from the first height 52. Through the use of such a configuration of the microstructure 4, the fluid flow which has come into contact with it undergoes a deviation simultaneously in both transverse directions 47 (horizontal and vertical) perpendicularly to the longitudinal direction 8, with an eddy, vortex, swirl, etc. being generated.

I claim:

1. A metal sheet, comprising:
   an inner region;
   a surface structure having a wave-shaped configuration with wave crests and wave troughs extending in a longitudinal direction, said wave-shaped configuration having a wavelength, a wave height and a ratio of wavelength to wave height lying in a range of 2.0 to 1.3;
   two slits disposed in said inner region, said slits each having at least one respective edge region and a recess in said at least one edge region, said recess having a radius in the range of 0.2 mm to 0.4 mm; and
   a microstructure at least partially delimited by said two slits, said microstructure projecting out of said surface structure.

2. The metal sheet according to claim 1, wherein said microstructure has a guide surface flared out from said surface structure.

3. The metal sheet according to claim 2, wherein said guide surface is flared out obliquely in a longitudinal direction from said surface structure.

4. The metal sheet according to claim 3, wherein said guide surface forms an angle in a range of 10° to 35° with said surface structure.

5. The metal sheet according to claim 1, wherein said recess has a rounded shape.

6. The metal sheet according to claim 5, wherein said recess is an arc of a circle.

7. The metal sheet according to claim 1, wherein said microstructure is one of a multiplicity of microstructures disposed in at least one of lines parallel to a longitudinal direction of the metal sheet or rows transverse to the longitudinal direction of the metal sheet.

8. The metal sheet according to claim 1, which further comprises a steel containing aluminum and chromium, having high thermal load-bearing capacities and being corrosion-resistant.

9. The metal sheet according to claim 8, wherein said steel has a thickness in a range of 0.015 to 0.15 mm.

10. The metal sheet according to claim 8, wherein said steel has a thickness in a range of 0.03 to 0.08 mm.

11. The metal sheet according to claim 1, wherein said surface structure has a wave-shaped configuration with a wavelength and a wave height, and said microstructure has a maximum extent out of said surface structure in a range of 0.3 to 0.95 of said wave height.

12. The metal sheet according to claim 1, wherein said surface structure has a wave-shaped configuration with a wavelength and a wave height, and said microstructure has a maximum extent out of said surface structure in a range of 0.5 to 0.8 of said wave height.

13. A carrier body for a component for the purification of exhaust gases, the carrier body comprising:
a plurality of at least partially structured metal sheets being at least one of stacked or wound to permit a fluid to flow through the carrier body, at least one of said metal sheets being a metal sheet according to claim 1.

14. The carrier body according to claim 13, which further comprises a multiplicity of passages extending substantially in a longitudinal direction and being at least partially formed by a surface structure of said metal sheets.

15. The carrier body according to claim 14, wherein said microstructure is one of a multiplicity of microstructures, and at least one of said microstructures influences the flow of the fluid to steer the fluid toward adjacent passages upon flowing through the carrier body.

16. The carrier body according to claim 14, wherein said multiplicity of passages have a passage density in a range of 100 to 1,100 cpsi.

17. The carrier body according to claim 14, wherein said multiplicity of passages have a passage density in a range of 300 to 600 cpsi.

18. The carrier body according to claim 14, wherein said multiplicity of passages have a uniform distribution over a cross section perpendicular to the longitudinal direction, at least in a partial region in the longitudinal direction.

19. The carrier body according to claim 15, wherein said multiplicity of microstructures is disposed in a cross section perpendicular to the longitudinal direction of the carrier body for steering the fluid flowing through in different directions.

20. The carrier body according to claim 13, which further comprises, in addition to said metal sheets, at least one smooth metal layer.

21. The carrier body according to claim 20, wherein said surface structure of said metal sheet has extremes, and said at least one smooth metal layer bears substantially against said extremes of said surface structure of said metal sheet.

22. The carrier body according to claim 21, wherein said at least one smooth metal layer is connected to said extremes of said surface structure of said metal sheet.

23. The carrier body according to claim 13, which further comprises, in addition to said metal sheets, at least one porous fiber layer.

24. The carrier body according to claim 23, wherein said surface structure of said metal sheet has extremes, and said at least one porous fiber layer bears substantially against said extremes of said surface structure of said metal sheet.

25. The carrier body according to claim 24, wherein said at least one porous fiber layer is connected to said extremes of said surface structure of said metal sheet.

26. The carrier body according to claim 13, which further comprises, in addition to said metal sheets, at least one housing surrounding said metal sheets at least in a portion of the carrier body.

27. The carrier body according to claim 13, which further comprises, in addition to said metal sheets, at least one sleeve surrounding said metal sheets at least in a connecting region of the carrier body for connection to a housing.

28. The carrier body according to claim 13, which further comprises, in addition to said metal sheets, at least one coating in at least one sector of the carrier body.

29. The carrier body according to claim 13, which further comprises, in addition to said metal sheets, at least one measuring device.

30. In an exhaust system, a component, comprising a carrier body according to claim 12 for purification of exhaust gases.

31. The component according to claim 30, wherein the component is selected from the group consisting of a catalytic converter, a flow mixer, an adsorber, and a particle trap.

* * * * *